A. N. HOOD.
REMOVABLE RIM FOR VEHICLE WHEELS.
APPLICATION FILED MAY 25, 1907.
974,770.
Patented Nov. 1, 1910.
2 SHEETS—SHEET 1.
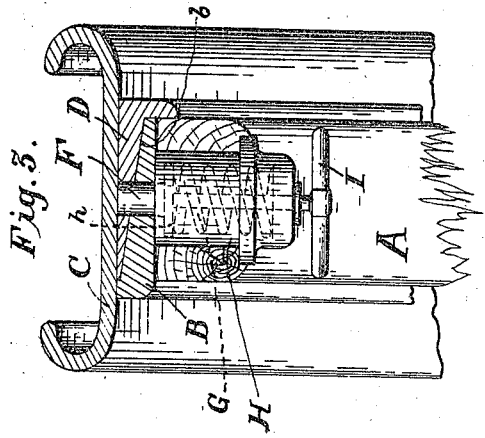
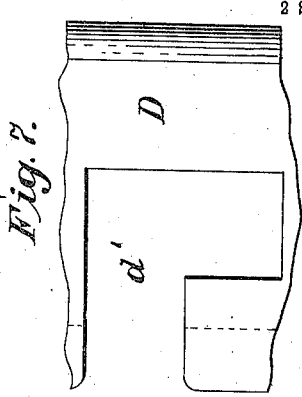
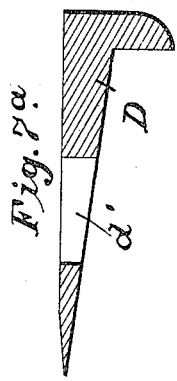
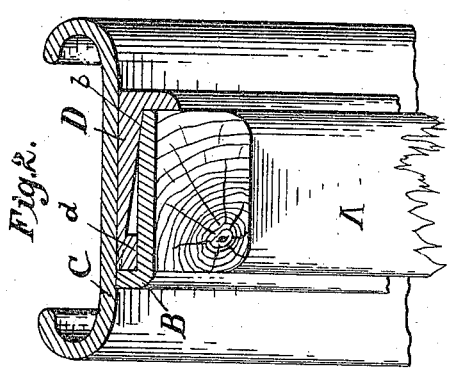
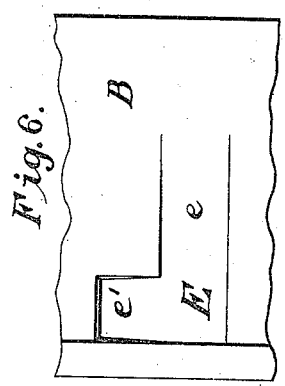
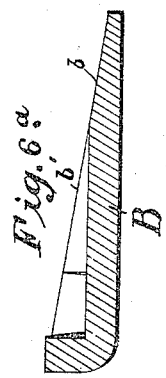
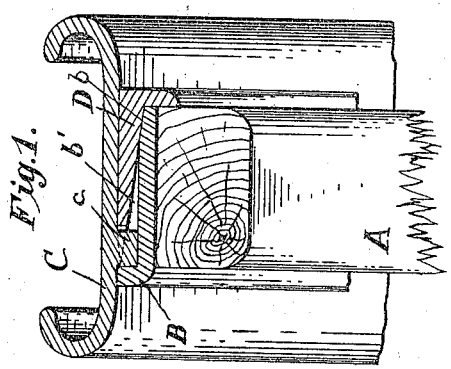
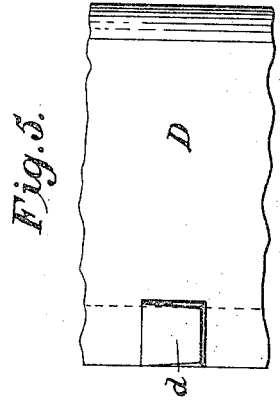
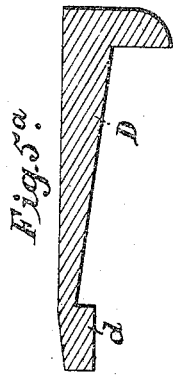
Attest:
Ewd L. Folson
Edward N. Saxton
Inventor,
Arthur N. Hood.
By Shear Middleton Donaldson & Shear
Attys

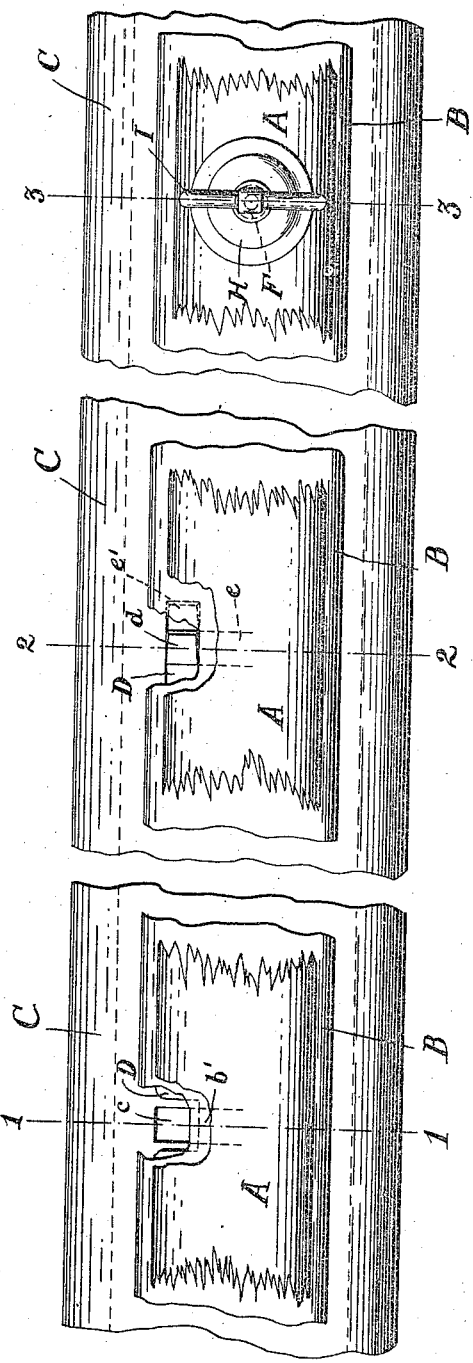

20# UNITED STATES PATENT OFFICE.

ARTHUR NEEDHAM HOOD, OF BOSTON, MASSACHUSETTS, ASSIGNOR TO HOOD RUBBER COMPANY, OF BOSTON, MASSACHUSETTS, A CORPORATION.

REMOVABLE RIM FOR VEHICLE-WHEELS.

974,770.

Specification of Letters Patent. Patented Nov. 1, 1910.

Application filed May 25, 1907. Serial No. 375,738.

*To all whom it may concern:*

Be it known that I, ARTHUR NEEDHAM HOOD, a citizen of the United States, residing at Boston, Massachusetts, have invented certain new and useful Improvements in Removable Rims for Vehicle-Wheels, of which the following is a specification.

My present invention relates to improvements in vehicle wheels, and more particularly to the fellies and rims thereof as designed for use in connection with motor vehicles.

The object of the invention is to provide an extremely simple and efficient construction by which an automobilist can carry one or more extra tubes and shoes or cases inflated on extra rims so that in case of an accident to a tire the rim with its damaged tire may be quickly and easily removed and replaced by the fresh inflated one.

With these objects in view the invention comprises the novel features of construction hereinafter described and particularly set forth in the appended claim.
The invention is illustrated in the accompanying drawings, in which,—

Figure 1 is a sectional view through a felly and rim on line 1—1 of Fig. 4. Fig. 2 is a similar section on line 2—2 of Fig. 4.
Fig. 3 is a like section on line 3—3 of Fig. 4. Fig. 4 is a bottom plan view. Figs. 5, 6 and 7 are detailed plan views of the various parts, on a larger scale. Figs. 5ª, 6ª and 7ª are sectional details of the parts shown in Figs. 5, 6 and 7, also enlarged.

Referring by reference characters to these figures the latter A designates the felly of the ordinary motor vehicle or automobile wheel. This is encircled by a permanent rim B which encircles the felly and is secured thereto in any desired manner. This rim B has an inclined upper surface $b$ as clearly shown in Fig. 6ª and is provided at suitable distances with a plurality of transverse grooves $b'$ which are designed to receive lugs $c$ projecting from the underside of the rim C which is shown for convenience as an ordinary clencher rim but may be a rim adapted to carry any ordinary or desired form of tire. The lugs $c$ engaging the transverse grooves $b'$ are designed to lock the two together against any circumferential movement. In order to fill the V-shaped space left between the inclined surface $b$ of the rim B and the inner face of the tire carrying rim C, I provide a wedge shaped locking ring D. This has at suitable intervals, lugs $d$, projecting downwardly from its thin edge which are designed to travel in bayonet slots E. The transverse portions $e$ of the slots permit the ring D to be inserted into the position as shown in Fig. 2, when a slight turn will cause the projections $d$ to enter the portions $e'$ at the bayonet slots, thus affording a firm support for the tire carrying rim. In order to hold this locking ring D against circumferential movement and thus prevent its accidental unlocking movement, I provide a bolt F which passes through alining openings in the rim B and ring D, whereby the two are locked together against relative circumferential movement. The pin is normally forced into engaging position by a spring G located in a casing H and bearing against a flange or collar $h$ on the pin. The pin is provided with a head I outside of the casing by which it may be withdrawn.

By this arrangement the side of a tire carrying rim may be first put in place, the valve tube of the pneumatic tire being inserted through the usual opening in the rim and felly and then the opposite side of the tire carrying rim swung into position owing to the inclined face $b$ of the rim B until the lugs C all rest against the closed ends of the recesses $b'$ in the position shown in Fig. 1 at which time the locking ring may be readily applied in the manner hereinbefore described, a slot $d'$ being provided for the passage of the valve stem.

It will be understood, of course, that where an all metal wheel is used the wood felly will be dispensed with and the spokes might be connected directly to the rim B, which in this instance would constitute the felly.

What I claim is:

In a vehicle wheel, a permanent rim having an inclined face and transverse grooves in its face, a tire carrying rim removably carried thereby and having lugs engaging said grooves, said permanent rim having also bayonet slots or grooves, a filling ring having lugs for engaging said bayonet grooves, and means for locking said filling ring against circumferential movement on the permanent rim, substantially as described.

In testimony whereof, I affix my signature in presence of two witnesses.

ARTHUR NEEDHAM HOOD.

Witnesses:
    GEORGE S. VAN VOORHIS,
    JAMES M. SPEAR.